L. G. NILSON.
OIL FEEDING MECHANISM.
APPLICATION FILED FEB. 25, 1907.

1,020,774.

Patented Mar. 19, 1912.

Witnesses:
Edmund O. Dubocq
Geo. N. Kerr

Inventor
Lars G. Nilson
By his Attorneys
Edwards, Sager & Wooster

UNITED STATES PATENT OFFICE.

LARS G. NILSON, OF HOBOKEN, NEW JERSEY, ASSIGNOR OF ONE-HALF TO WILLIAM B. STRANG, OF NEW YORK, N. Y.

OIL-FEEDING MECHANISM.

1,020,774.  Specification of Letters Patent. Patented Mar. 19, 1912.

Application filed February 25, 1907. Serial No. 359,268.

*To all whom it may concern:*

Be it known that I, LARS G. NILSON, a citizen of the United States, residing at Hoboken, in the county of Hudson and State of New Jersey, have invented certain new and useful Improvements in Oil-Feeding Mechanism, of which the following is a full, clear, and exact specification.

This invention relates to oil feeding mechanism, and has particular reference to an apparatus for supplying oil by pressure to the bearings of a combustion engine or other machine.

More especially, the invention has application to internal combustion engines, which are commonly oiled either by gravity feeding devices, or by what is known as the "splash" system, wherein the crank or some other incased moving part is caused to dip into a pool of oil and splash the same around in such manner as to lubricate the various bearing surfaces. In such a system, the oil may work up into the combustion chamber and foul the cylinder, or if the engine be tilted, will be insufficiently supplied to some parts, and others will be flooded. Also in such a system the oil will become very dirty with continued use over and over.

The object of this invention is to provide a forced oil feeding system in combination with a filter, whereby an excess of oil may be supplied to the bearings, cleaned and used over again.

In carrying out the invention, there is provided an oil reservoir capable of storing a supply of oil, and receiving the excess oil from the bearings. From this reservoir, the oil is pumped under pressure through distributing pipes to the points where it is to be used. Preferably, the circulating system will contain one or more filtering devices through which the oil will be forced under pressure, thereby removing any solid matters, and insuring a uniform supply of clean oil while the engine is running, and independent of its position.

Further features of the invention relate to the particular means for feeding oil to the cylinder, for cooling as well as lubricating purposes, and to moving bearings such as the crank pin and wrist pin.

The invention also comprehends an oil filter, together with a device for maintaining the oil at a substantially determined feeding pressure; and in the combinations of the various parts, all of which will be more fully explained in connection with the accompanying drawings, wherein—

Figure 1:
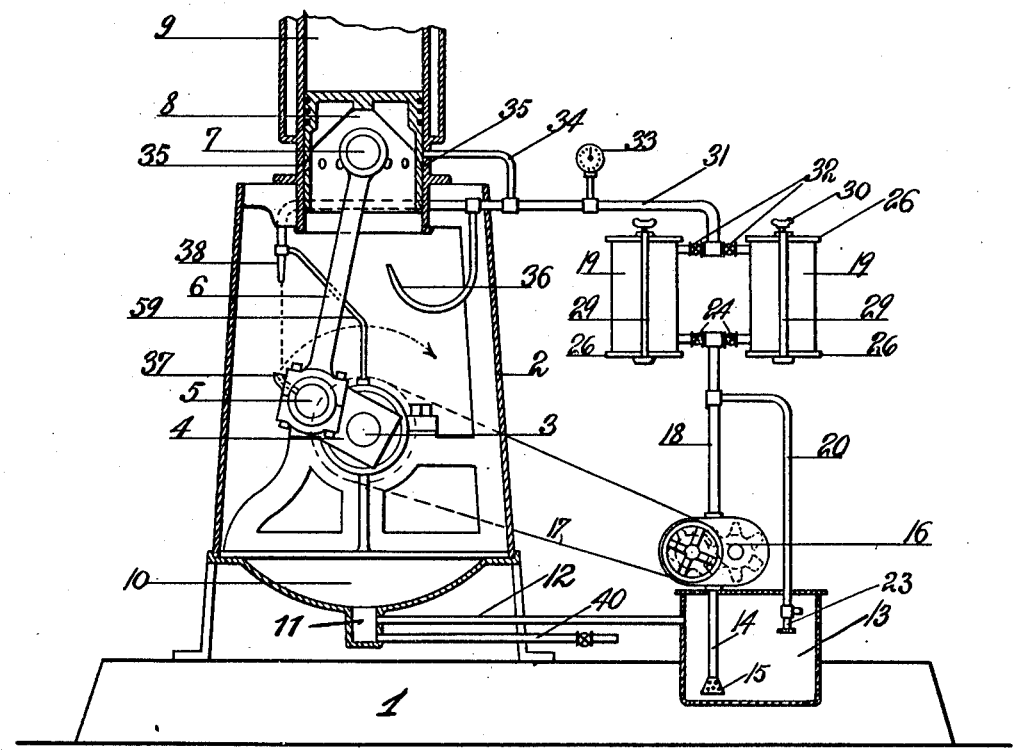
Figures 2, 3:
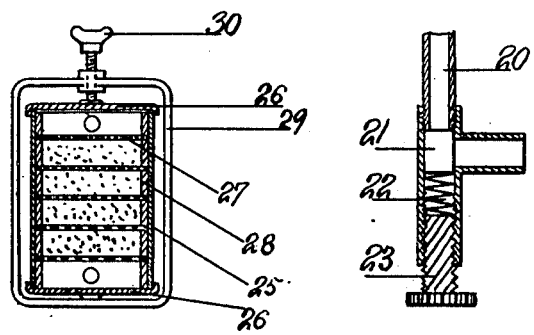

Figure 1 is a diagram of an oil feeding system for a combustion engine, embodying the invention; Fig. 2 is a view in cross section of the filter, and Fig. 3 is a detail view of a valve device for maintaining the oil at a determined pressure.

1 represents the bed of an engine motor, 2 the frame, 3 crankshaft, 4 crank, 5 crank pin, 6 connecting rod, 7 wrist pin, 8 piston, and 9 the cylinder, all being of any desired construction and number of cylinders. The bottom of the engine casing is formed as a drain 10, in which the excess oil collects and from the lower portion 11 of which, a pipe 12 leads to a pump reservoir 13. Extending from about the bottom of this reservoir 13 is a pump inlet pipe 14, having a strainer 15 to remove coarse particles.

16 is an oil pump, herein shown as of the gear type, driven from the shaft 3 by a belt 17, and forcing the oil through outlet pipe 18 to the oil filters 19. It will be understood that any other form of pump could be used instead, this being a well known form and readily understood. Between pump 16 and filter 19, is a by-pass pipe 20 leading back to the tank 13, and this pipe is normally closed by a plug 21, which moves downward to open pipe 20 to the tank when the pressure exceeds a determined amount, as in case the pipes clog up or at excessive speed. To regulate the pressure and prevent damage the plug 21 is held seated by a spring 22, the tension of which, and thus the maximum oil pressure, can be regulated by a screw 23. The filters 19 are similarly constructed, and a description of one will suffice for both, it being observed that the pipe 18 is branched, each branch having a cock 24.

Referring now to Fig. 2, the filter comprises a casing 25, having removable heads 26, and a series of screens 27, spaced by rings 28. The spaces between the screens will be filled with hair, or other filtering material, and preferably of graduated fineness, the coarsest being at the inlet end. To hold the heads together, an outside clamping ring 29, having a clamping screw 30, is provided and by loosening the screw, the whole will quickly come apart, as for cleaning. Each filter is connected at the top to a main supply pipe 31, provided with cocks 32, and a pressure gage 33, and from this pipe 31 lead the various distributing pipes.

To lubricate the cylinder, the piston is provided with a series of inclined holes 35, and a pipe 36 having a restricted nozzle, so as to form a jet, is provided, which is positioned to direct a jet of oil into the interior of the piston. This jet of oil will scatter and oil the cylinder through holes 35. This same arrangement will lubricate the moving wrist pin bearing at the same time, as well as cool the piston and adjacent parts. In engines of large size, it is found difficult to keep the piston cool, but by means of the oil jet, such difficulty is avoided and the wrist pin and cylinder at the same time kept lubricated. For oiling the crank pin, a cup 37 is formed on the end of the connecting rod having an oil passage to the bearing. A nozzle 38, connected to pipe 31, is so positioned as to direct a jet of oil into the cup 37, as the connecting rod moves upward.

59 is a distributing pipe leading to the main shaft bearings.

40 is a pipe for emptying the drain 10, and a pipe 34 may be provided to oil the cylinder directly if desired.

By adjusting the screw 23, and appropriately speeding the oil pump, excessive pressure will be prevented in the oil supply pipe 31, and also the oil pressure rendered adjustable. It may however, be desirable to increase the feeding pressure at high speeds, and this can readily be done by means of the screw. Also, the pressure will be sufficient to cause the oil to spurt out of the nozzles, so that the bearing parts will be flooded, and thereby cooled as well as lubricated. Ordinarily, it is proposed to use but one filter at a time, which can be done by means of the cocks 24 and 32, leaving the other in reserve, or permitting it to be cleaned without interfering with the engine.

So far as I am aware, it has not heretofore been proposed to oil the cylinder from the interior of the piston, and at the same time supply an excess of oil which will cool the piston head and adjacent parts, and lubricate the wrist pin as well.

From the foregoing description, it will be seen that a forced oil feeding system is provided, having all the advantages of the splash system as to cooling, and none of the disadvantages, such as using dirty or gritty oil and uneven distribution of oil.

It will be understood that the construction and arrangement of the various parts may be varied without departing from the scope of the invention, which is not to be restricted to the precise form shown.

Having thus described my invention, I declare that what I claim as new and desire to secure by Letters Patent, is,—

1. In an oil feeding system for a combustion engine, the combination with a hollow piston having oil passages therethrough, of an oil force pump and a stationary distributing nozzle leading from said pump and discharging a jet of oil into the hollow of said piston to fill the passages, whereby to oil the connecting rod and the interior of the cylinder.

2. In an oil feeding system for a combustion engine, the combination with a piston, a connecting rod, and a crank shaft, of means for oiling the crank pin continuously while the engine is running comprising a drain for collecting oil, a pump, and a distributing pipe from the pump having a stationary nozzle located to discharge a jet of oil toward the crank.

3. The combination with the cylinder and piston of a combustion engine, of a drain for collecting oil, a distributing pipe having a stationary nozzle, a hollow piston surrounding said nozzle at one position, passages through said piston to the sides, and a pump driven by the engine and supplying an excess of oil to the interior of the piston whereby to cool as well as oil the piston while the engine is running.

In testimony whereof I affix my signature, in presence of two witnesses.

LARS G. NILSON.

Witnesses:
 JULIAN S. WOOSTER,
 EDMUND O. DUBOCQ.